(12) United States Patent
López Robayo

(10) Patent No.: US 11,035,196 B2
(45) Date of Patent: Jun. 15, 2021

(54) HYDRAULIC DEVICE AND METHOD FOR LOCATING AND SEALING HOLES OR CRACKS IN OIL WELL PRODUCTION TUBING

(71) Applicant: Byron Raúl López Robayo, Quito (EC)

(72) Inventor: Byron Raúl López Robayo, Quito (EC)

( * ) Notice: Subject to any disclaimer, the term of this patent is extended or adjusted under 35 U.S.C. 154(b) by 191 days.

(21) Appl. No.: 16/097,318

(22) PCT Filed: Dec. 15, 2016

(86) PCT No.: PCT/IB2016/057634
§ 371 (c)(1),
(2) Date: Oct. 29, 2018

(87) PCT Pub. No.: WO2017/187247
PCT Pub. Date: Nov. 2, 2017

(65) Prior Publication Data
US 2019/0093446 A1    Mar. 28, 2019

(30) Foreign Application Priority Data

Apr. 29, 2016    (EC) .................. IEPI-2016-17451

(51) Int. Cl.
*E21B 33/124* (2006.01)
*E21B 23/01* (2006.01)
(Continued)

(52) U.S. Cl.
CPC ............ *E21B 33/124* (2013.01); *E21B 23/01* (2013.01); *E21B 29/10* (2013.01); *E21B 33/129* (2013.01);
(Continued)

(58) Field of Classification Search
CPC .. E21B 33/124; E21B 33/126; E21B 33/1293; E21B 33/1295; E21B 33/13; E21B 33/138; E21B 23/08; E21B 23/10
See application file for complete search history.

(56) References Cited

U.S. PATENT DOCUMENTS 2,360,311 A * 10/1944 Ausburn ............... E21B 33/134
166/146
4,659,530 A    4/1987 Boyers et al.
(Continued)

FOREIGN PATENT DOCUMENTS

EP    2304306 B1    3/2009
GB    2448960 A    11/2008
(Continued)

OTHER PUBLICATIONS

International Search Report, PCT Patent Application No. PCT/IB2016/057634, dated Apr. 21, 2017.

*Primary Examiner* — Robert E Fuller
*Assistant Examiner* — Lamia Quaim
(74) *Attorney, Agent, or Firm* — Kilpatrick Townsend & Stockton LLP

(57) ABSTRACT

The invention relates to a hydraulic device for in situ hermetic sealing of holes, cracks or leaks from joints that occur in underground production tubing used for the extraction of oil, gas or other fluids. In particular, the invention relates to a device comprising an assembly including four sections comprising various securing and anchoring means, and to the method for moving the device in order to detect and locate the site of the leak and to position the device inside the fluid production tubing, such that it remains fixed in place and hermetically seals the damaged section of the production tubing, allowing normal production flow to be resumed.

19 Claims, 13 Drawing Sheets

(51) Int. Cl.
  *E21B 47/10* (2012.01)
  *E21B 29/10* (2006.01)
  *E21B 33/129* (2006.01)
  *E21B 34/06* (2006.01)
  *F16L 55/165* (2006.01)

(52) U.S. Cl.
  CPC ........ *E21B 33/1293* (2013.01); *E21B 34/063* (2013.01); *E21B 47/10* (2013.01); *F16L 55/1657* (2013.01); *F16L 2201/30* (2013.01)

(56) References Cited

U.S. PATENT DOCUMENTS

| | | |
|---|---|---|
| 5,267,617 A | 12/1993 | Perricone et al. |
| 5,785,120 A | 7/1998 | Smalley et al. |

FOREIGN PATENT DOCUMENTS

| | | |
|---|---|---|
| WO | 2000/45029 A2 | 8/2000 |
| WO | 2001/80650 A2 | 11/2001 |

* cited by examiner

TYPICAL MECHANICAL COMPLETION OF A WELL WITH HYDRAULIC PUMPING, NATURAL FLOW, AND SUBMERSIBLE ELECTRIC PUMPING

TYPICAL MECHANICAL COMPLETION OF A WELL WITH HYDRAULIC PUMPING,
NATURAL FLOW, AND SUBMERSIBLE ELECTRIC PUMPING

FIGURES 2B AND 2C - DETAIL OF UPPER AND EXTENSION SECTIONS
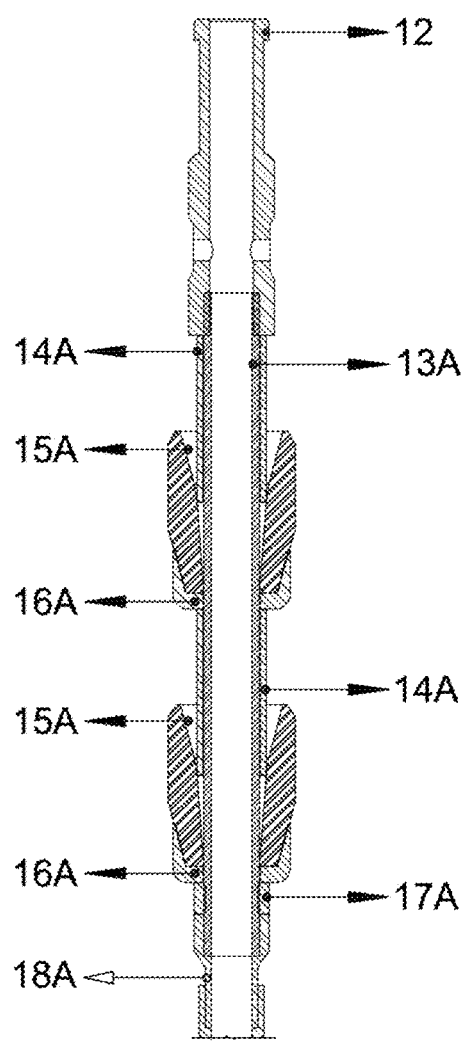
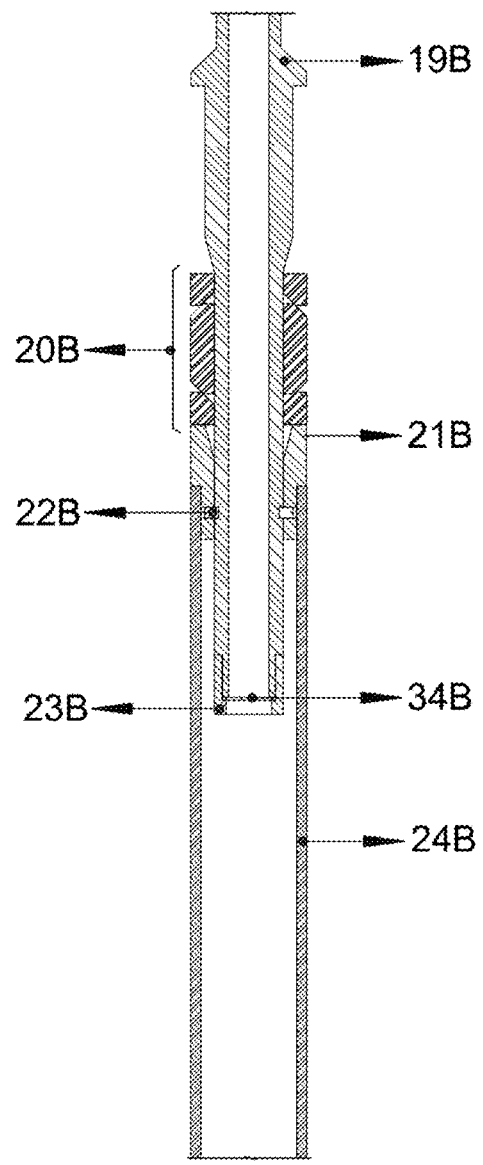
FIGURE 2B
FIGURE 2C FIGURES 2D AND 2E – DETAIL OF CENTRAL AND LOWER SECTIONS
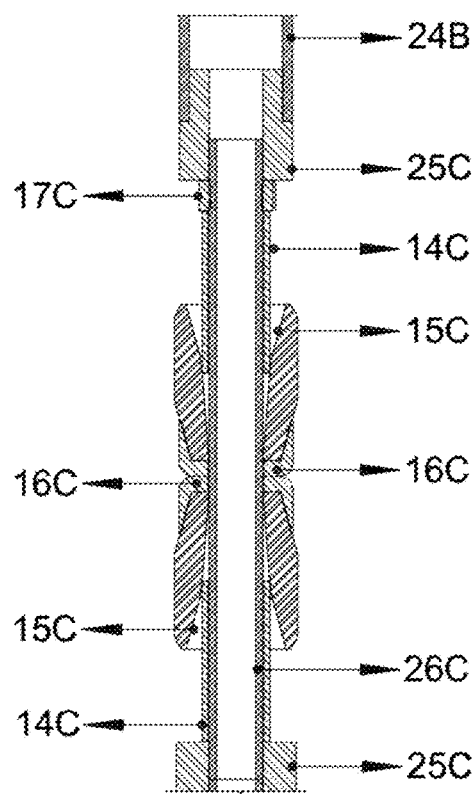
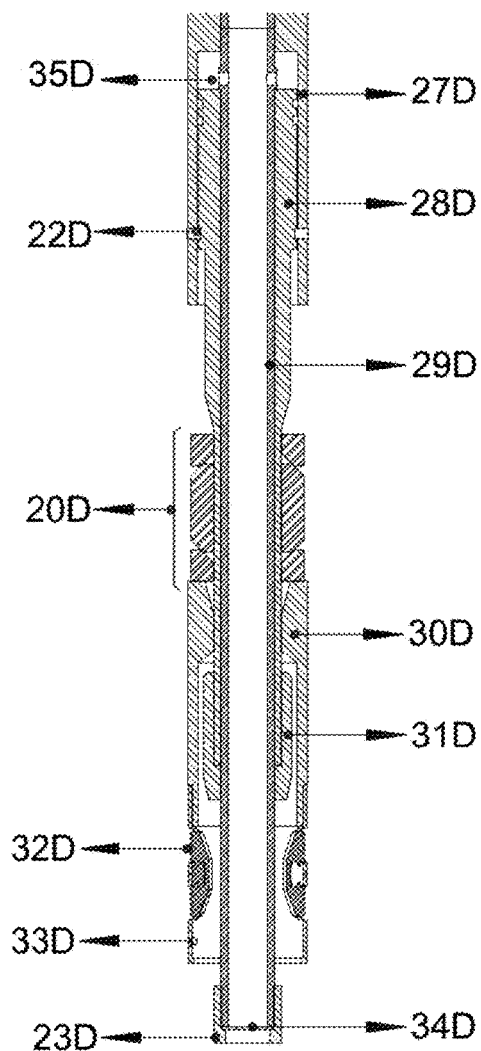
FIGURE 2D
FIGURE 2E TYPICAL MECHANICAL COMPLETION OF A WELL WITH HYDRAULIC PUMPING,
NATURAL FLOW, AND SUBMERSIBLE ELECTRIC PUMPING FIGURES 3B AND 3C - DETAIL OF UPPER, EXTENSION AND CENTRAL SECTIONS
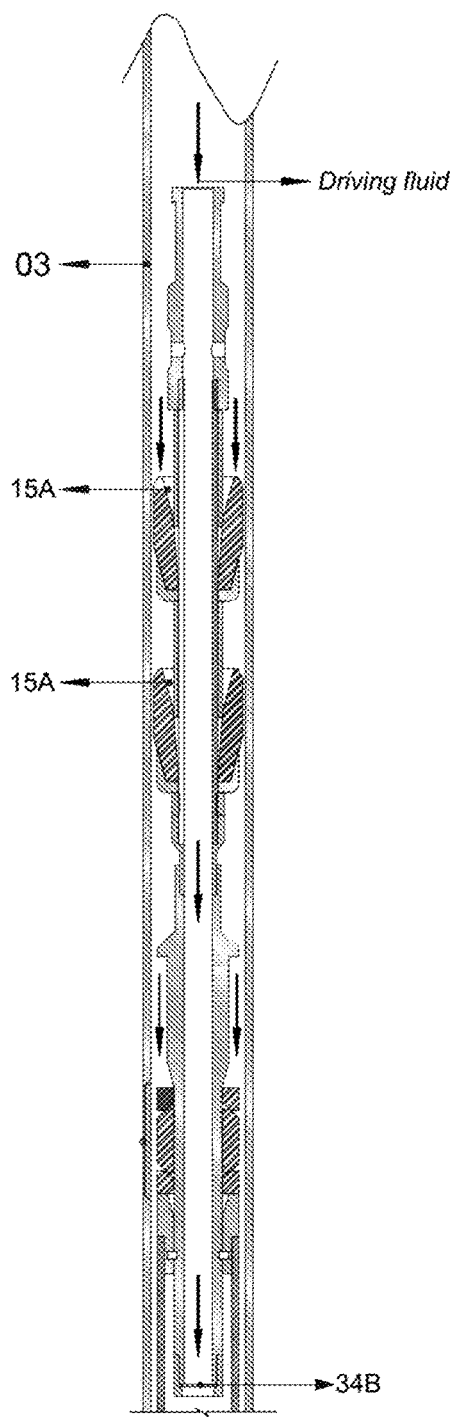
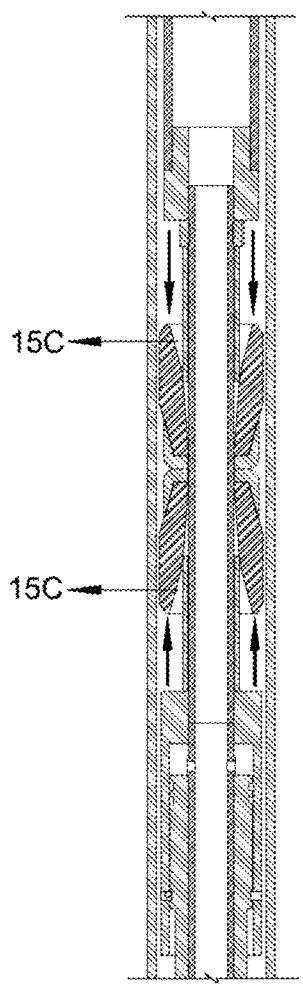
FIGURE 3B
FIGURE 3C TYPICAL MECHANICAL COMPLETION OF A WELL WITH HYDRAULIC PUMPING,
NATURAL FLOW, AND SUBMERSIBLE ELECTRIC PUMPING

FIGURES 4B, 4C AND 4D - DETAIL OF UPPER, EXTENSION, CENTRAL AND LOWER SECTIONS

TYPICAL MECHANICAL COMPLETION OF A WELL WITH HYDRAULIC PUMPING,
NATURAL FLOW, AND SUBMERSIBLE ELECTRIC PUMPING

FIGURES 5B AND 5C - DETAIL OF UPPER, EXTENSION, CENTRAL AND LOWER SECTIONS

TYPICAL MECHANICAL COMPLETION OF A WELL WITH HYDRAULIC PUMPING,
NATURAL FLOW, AND SUBMERSIBLE ELECTRIC PUMPING

FIGURES 6B, 6C AND 6D - DETAIL OF UPPER, EXTENSION, CENTRAL AND LOWER SECTIONS

HYDRAULIC DEVICE AND METHOD FOR LOCATING AND SEALING HOLES OR CRACKS IN OIL WELL PRODUCTION TUBING

FIELD AND PURPOSE OF THE INVENTION

The present invention relates to production tubing at oil wells, and to a device and a method for in situ sealing of holes or cracks caused as a result of corrosion and other factors on the walls of the tubes intended for oil extraction, at any section thereof. Specifically, it relates to a new device that works by hermetically sealing the hole or crack through which the leak occurs. Once the leak is detected from the surface by means of hydraulic displacement of the device in a controlled manner up to the leak site, the device becomes attached to the hole or crack in such a way that, once settled, attached and sealed, it allows to immediately resume the inner flow in the oil production process, thus avoiding the need to stop production for a long time, until the tubing is removed and the hole is sealed on the surface.

STATE OF THE ART BACKGROUND

Oil production in a well is carried out through production tubes that are installed from the surface to the bottom, at the level where the production field is located. Such tubes, whose diameter is smaller than that of the well casing tubes, are made of steel and generally feature high resistance to the corrosion caused by fluids (water, oil and gas) flowing from the well towards the surface. However, the tubing's resistance to corrosion has limits which, once exceeded, may lead to severe alterations, such as holes or cracks which, though localized, seriously affect production continuity.

In the case of oil and other fluids, the existence of a hole or crack is quickly determined after observing a pressure drop in the extraction fluid. Thus on noticing that there is a leak in the production tubing, the cause must be repaired as soon as possible, particularly for cost reasons (due to product losses) and because, if left unattended, it may lead to a worsening of its causes, to the point where the extraction must be stopped for a long time in order to repair it, which results in a substantial increase in production costs, not only from the paralysis in the crude oil extraction, but also from the costs associated with the entire piping assembly and control accessories, fluid extraction pumps (where applicable), sleeves and other elements which are part of the piping assembly and the internal completion of the extraction tubing at the oil well, as well as its subsequent replacement to resume the pumping activity.

In oil fields there are a large number of wells that are closed due to broken pipes or the formation of a hole or crack, thus causing a loss of production. The time when the broken tubing is to be changed depends on the availability of reconditioning drills; therefore, the waiting time for well reconditioning may be weeks or months.

In the state of the art, some procedures were developed with the intention to solve this problem, such as those described in the following patents:

Patent EP 2304306 A1, "Method for in-situ repair of a hole in pipe in pipe tubular", of 31 Mar. 2009. This patent presents a method for the in situ repair of a hole in tubular pipes. The method comprises the following steps: Introduction of a hole sealing device for tubular pipes, identification of a hole in the tubing, and injection of a sealing agent in the hole through a hole sealing device. Consequently, any holes in the pipes of tubular piping may be repaired without the costs involved in the extraction of interior pipes from the outside. Additionally, a suitable device for the method is supplied.

U.S. Pat. No. 5,785,120, TUBULAR PATCH. 28 Jul. 1998. This patent presents: A tubular patching system for patching operations which, in one aspect, is useful as a tubular patching system "through the tubing", with a body and a series of selectively expandable members that, after going through a tubular pipe with a first diameter, they expand into a tubular pipe with a second diameter which is greater than the first, and may be then operated to expand a coating patch intended to seal a leak in the tubular pipe with the second diameter. Said system may be used in a tubular pipe arranged inside a well or in a tubular pipe in the earth's surface.

The methods proposed by the above cited patents are different from the method proposed by the present invention, since the latter does not include the application of any sealing agents or patches to fill the hole. Instead, a hydraulic device is used in order to detect a hole or crack and to insulate it; such a device is installed at the place where the hole or crack is located, and the production is resumed immediately thereafter.

BRIEF DESCRIPTION OF THE INVENTION

The present invention relates to a hydraulic device and a method to determine the location of the leak site in the underground tubing, whether caused by a hole or crack, or by a leak in a threaded joint, in the tubing where oil or a similar liquid flows, which is located underground. The innovative hydraulic device and the method allow location and sealing of any holes or cracks in the production tubing of oil wells. The device comprises an upper section, a lower section, an extension section, a hydraulic positioner for location of leaks, as well as an anchoring means to attach the device at the level of the hole or crack.

This device is hydraulically moved from the surface and is driven through the inside of the production tubes by means of a fluid at a pressure of 344.74 KPa (50 psi). Whenever a hole or crack is detected, the device stops. At this moment, the technician who is monitoring the operation on the surface proceeds to increase, in several stages, the hydraulic pressure of the fluid so that the equipment is anchored at that location and creates a hermetic seal between the body of the hydraulic device and the hole or crack that is detected in the production tubing, thus allowing for the well fluid to resume its normal flow through the internal tubes that are a part of the hydraulic device, once the hole or seal has been sealed by implementing such device.

Consequently, the invention swiftly and safely solves the problem of a decreased outlet flow and the pressure drop caused by a leak of the fluid being extracted, particularly, in the oil production tubing which, as previously noted, leads to major operation losses due to the high costs required by the current extraction practices.

The purpose of the present invention is that, whenever a hole or crack appears in the production tubing of an oil well or in a threaded joint at any depth, there is no need to perform a reconditioning of the well, which would entail having a tower available to recover the entire production drilling train and to detect the location of the damaged tube or accessory for their replacement. Such activities would cause a loss of at least 7 days of production in the well, and the cost of maintenance or replacement of the accessories and the well pump. This situation is solved in a simple and economical way by using the present hydraulic device and method to locate and seal holes or cracks in production tubing at oil wells, thus allowing for the well to resume its normal operations within approximately 6 hours.

The device and method described in the present specification must be preferably used in wells equipped with oil lifting means with submersible electric pumps, hydraulic pumping, or natural flow production. The device is between 2.00 and 3.00 m long, and has a diameter of between 75 mm and 115 mm.

BRIEF DESCRIPTION OF FIGURES

FIGS. 2A, 2B, 2C, 2D, and 2E, collectively referred to as FIG. 2, represent cross section views of the hydraulic device assembled as per the present invention, comprising four sections: upper section, extension section, central section, and lower section.

The Upper Section comprises: the Fishing Neck [FIG. 2B (12)], which is used for the recovery of the Hydraulic Device via wire line; 1 Upper Cylinder [FIG. 2B (13A)], where the upper displacement means are coupled, comprising 2 Spacers [FIG. 2B (14A)], 2 Retainer Rubbers [FIG. 2B (15A)], 2 Rubber Retainers [FIG. 2B (16A)], and an Adjuster Nut [FIG. 2B (17A)] to adjust the rubber retainers [FIG. 2B(15A)]. Finally, 1 Reduction [FIG. 2B (18A)].

The Extension Section comprises: 1 Upper Piston [FIG. 2C (19B)], to which the upper sealing means is coupled, comprising 3 Expansion Joints [FIG. 2C (20B)] attached to the upper end of the Extension Tube [FIG. 2C (24B)] by an Upper Joint Retainer [FIG. 2C (21B)], which is in turn attached to the Extension Tube by 2 Cutting Set Screws [FIG. 2C (22B)]. At the lower end of the Upper Piston [FIG. 2C (19B)], there are elements for the temporary obstruction of the internal flow communication, comprising 1 Disc Retainer [FIG. 2C (23B)] and a Rupture Disc [FIG. 2C (34B)].

The Central Section comprises: a Lower Adapter [FIG. 2D (25C)] for start-up, whose role is to connect the Extension Tube [FIG. 2D (24B)] with the Central Cylinder [FIG. 2D (26C)], where the lower displacement means is coupled, comprising 2 Spacers [FIG. 2D (14C)], 2 Retainer Rubbers [FIG. 2D (15C)], 1 Rubber Retainer [FIG. 2D (16C)]. This allows to detect the hole or crack in the production tubing, thanks to the lower Retainer Rubber [FIG. 2D (15C)] placed in an upside down position relative to the upper retainer rubber.

The Lower Section comprises: the Lower Piston Casing [FIG. 2E (27D)], which also acts as a point of convergence between the Central Cylinder [FIG. 2E (26C)] and the Lower Cylinder [FIG. 2E (29D)] comprises two flow holes [FIG. 2E (35D)]; within the casing, the Lower Piston [FIG. 2E (28D)] slides and activates the lower sealing means, comprising 3 Expansion Joints [FIG. 2E (20D and a Lower Joint Retainer [FIG. 2E (30D)], which sets the position of the expansion joints. At the lower end of the Lower Piston [FIG. 2E (28D)], the Sliding Cone is connected [FIG. 2E (31D)], which in turn activates the anchor means, comprising a Cage [FIG. 2E (33D)], 2 Wedges [FIG. 2E (32D)], a Disc Retainer [FIG. 2E (23D)], and a Rupture Disc [FIG. 2E (34D)].

Figure 1:
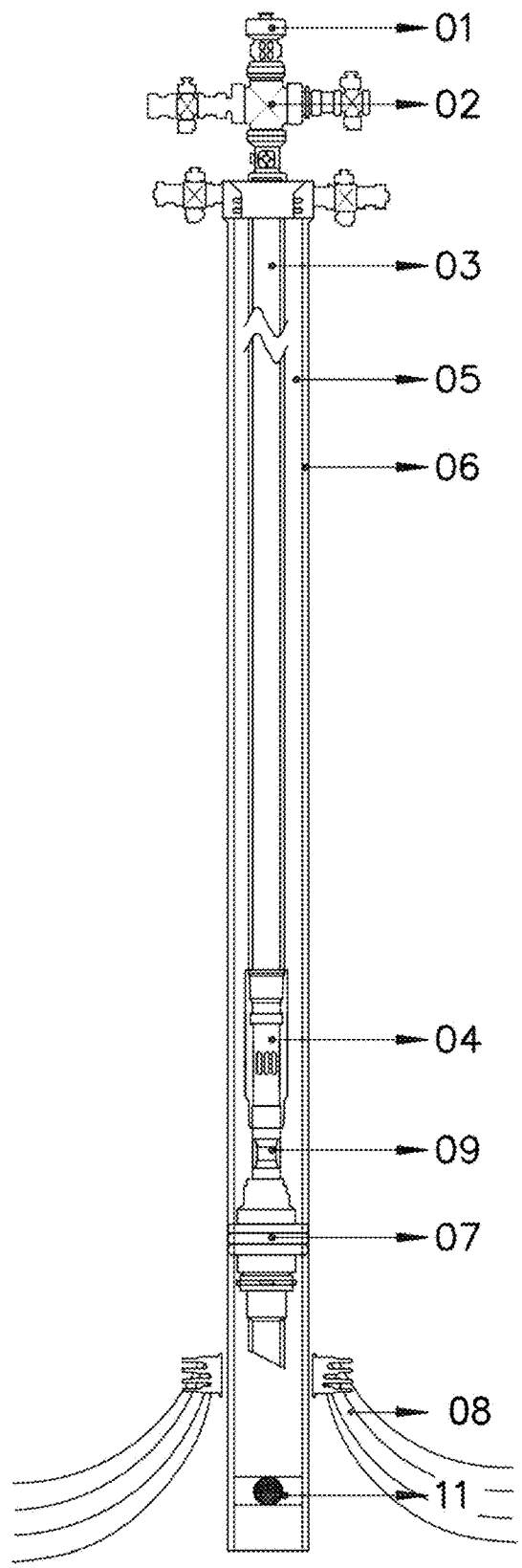
FIG. 1 represents a schematic view of the Typical Mechanical Completion of an Oil Well with Hydraulic, Electric and/or Natural Flow, where the following is specified: the well's header with its respective plug [FIG. 1(01)]; a central valve to introduce tools or devices to the bottom of the well [FIG. 1(02)] through the production tubing, the production tubing [FIG. 1(03)] which allows for the flow and high pressure injection of driving fluid towards the underground pump located in the circulation sleeve [FIG. 1(04)], which may be a jet hydraulic pump or a submersible electric pump, or neither of the above in the case of fluid production by Natural Flow; the annular space [FIG. 1(05)]; the coating tube [FIG. 1(06)]; the gasket [FIG. 1(07)], installed at the bottom of the well, which permits to insulate the field [FIG. 1(08)] from the annular space [FIG. 1(05)]. Additionally, the completion includes a settling nipple [FIG. 1(09)], which houses the hydraulic closing valve to perform leak tests on the production tubing [FIG. 1(03)]; and an insulating plug [FIG. 1(11)]; to separate the deeper fields.
Figure 2A:
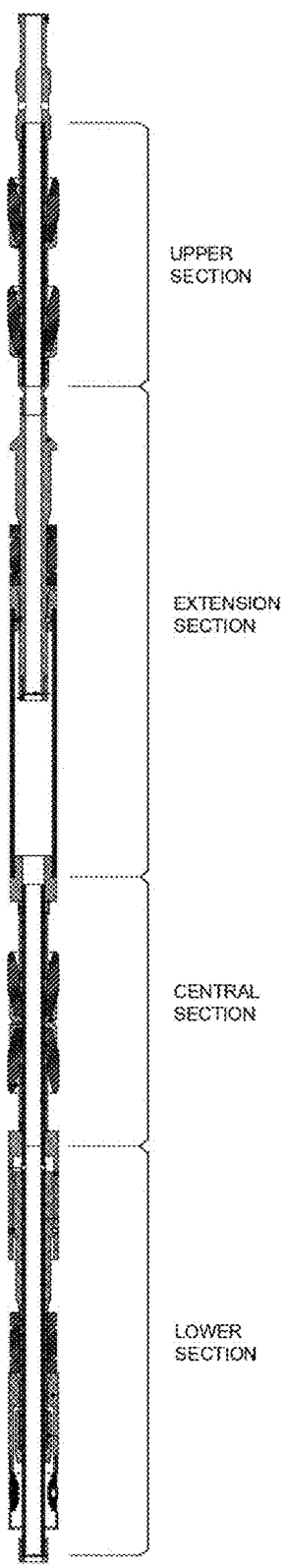
Figure 3A:
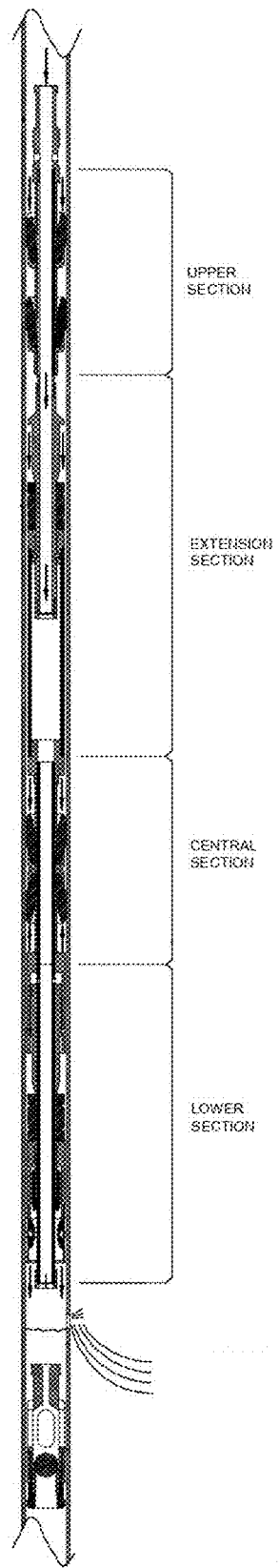
Figure 3D:
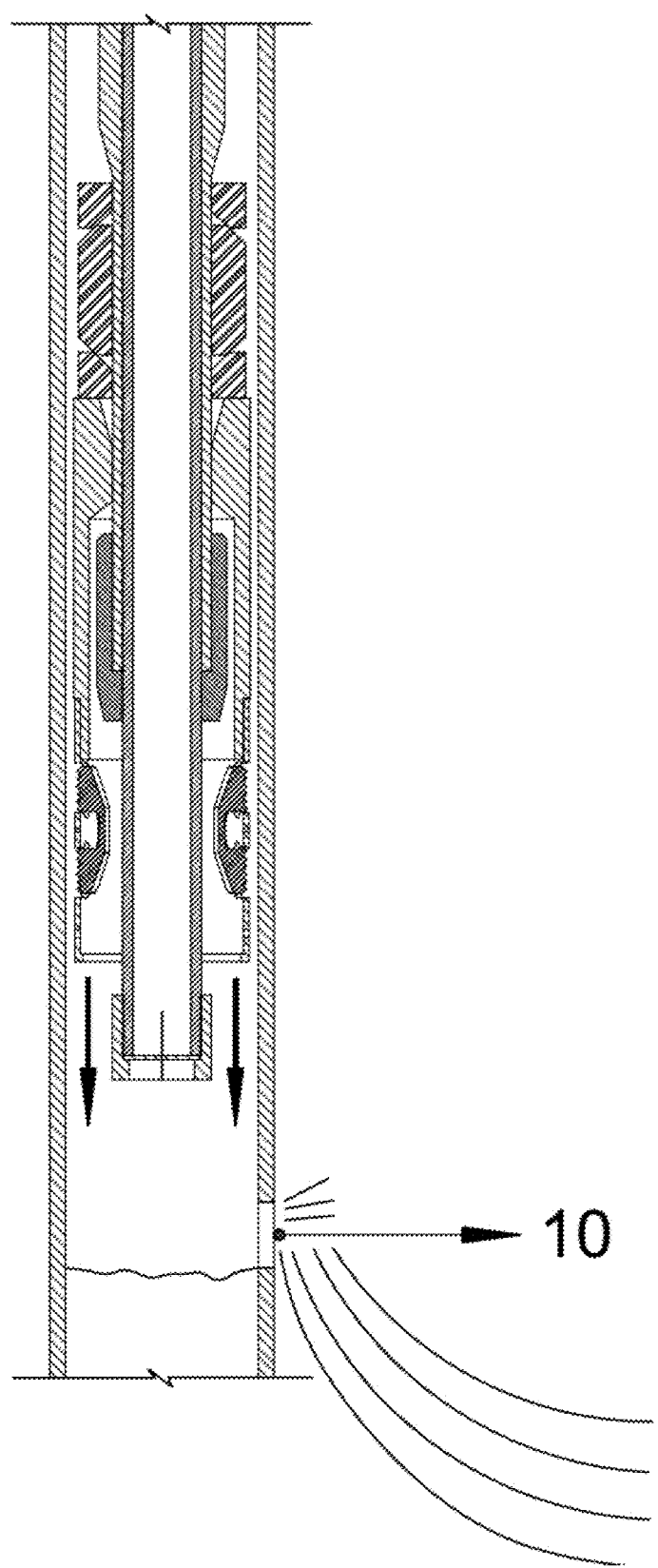

FIGS. 3A, 3B, 3C, and 3D, collectively referred to as a FIG. 3 show cross section views of the Hydraulic Device [FIG. 2A] moving through the interior of the Production Tubing [FIG. 1 (03)]. The upper and lower Retainer Rubbers [FIGS. 3B (15A) and 3B (15C)], are already expanded, and the fluid leaking through the hole or crack [FIG. 3D (10)] when the Hydraulic Device [FIG. 2A] continues to move towards the hole or crack through the interior of the production tubing [FIG. 1 (03)].

Figure 4A:
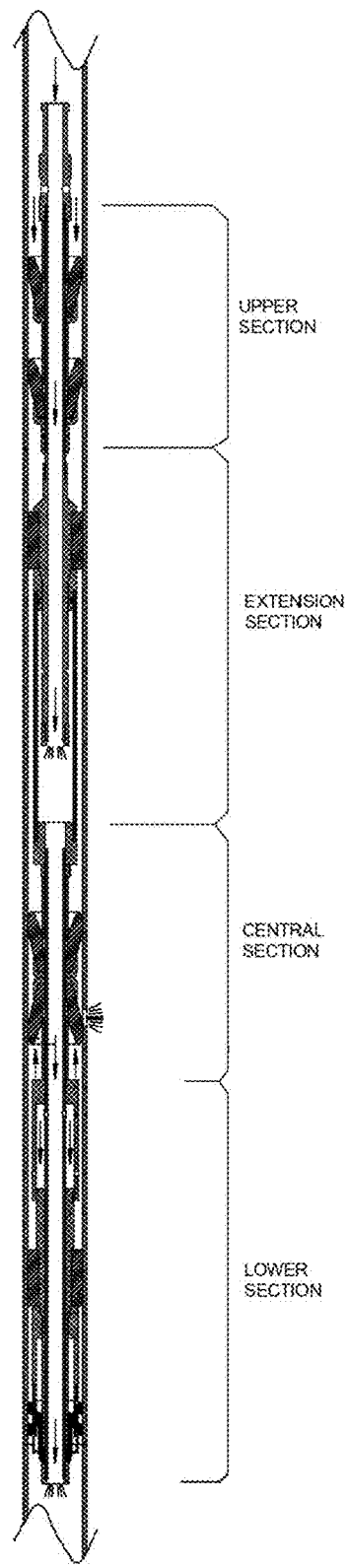
Figure 4B:
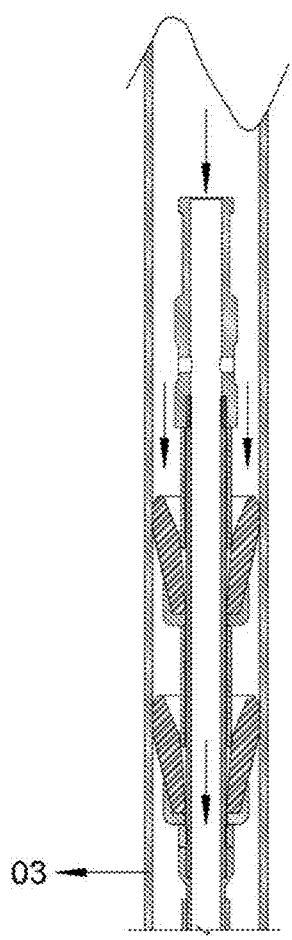
Figure 4C:
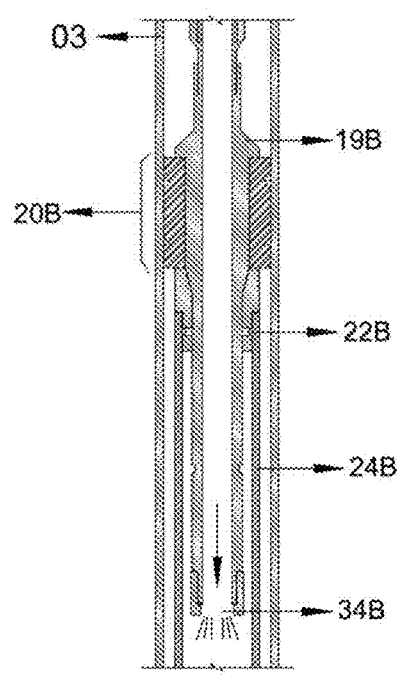
Figure 4D:
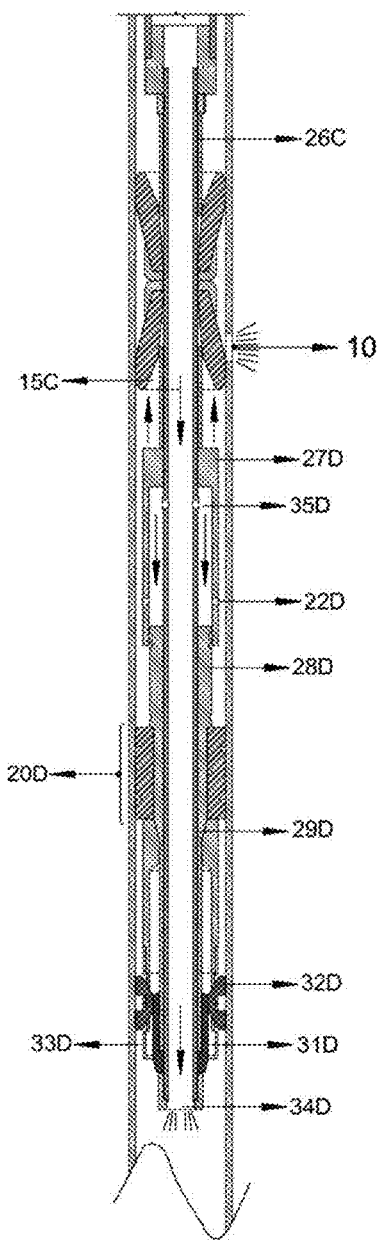

FIGS. 4A, 4B, 4C, and 4D, collectively referred to as FIG. 4 show cross section views of the hydraulic device (FIG. 2A) after being settled, anchored and sealing the hole or crack, once the hole or crack has been detected [FIG. 4D (10)]. The Retainer Rubber is upside down [FIG. 4D (15C)], blocking the flow through the hole or crack [FIG. 4C (24B)]; the 2 upper Cutting Set Screws [FIG. 4C (22B)], now cut; the Upper Piston [FIG. 4C (19B)], displaced inside the Extension Tube [FIG. 4C (24B)]; the 3 upper Expansion Joints [FIG. 4C (20B)], now expanded; the Rupture Disc [FIG. 4C (34B)], now broken; the fluid flowing through the Extension Tube [FIG. 4C (24B)], Central Cylinder [FIG. 4D (26C)], Lower Cylinder [FIG. 4D (29D)], and the 2 flow holes [FIG. 4D (35D)]; the Lower Piston Housing [FIG. 4C (24B)] shows the 2 lower Cutting Set Screws [FIG. 4D (22D)], already cut, the Lower Piston [FIG. 4D (28D)], displaced downwards, the 3 lower Expansion Joints [FIG. 4D (20D)], already expanded, the lower 2 Wedges [FIG. 4D (32D)], anchored to the production tubing [FIG. 4D (32D)] by the Sliding Cone [FIG. 4D (31D)], which is displaced downwards, and the lower Rupture Disc [FIG. 4D (34D)], already broken.

Figure 5A:
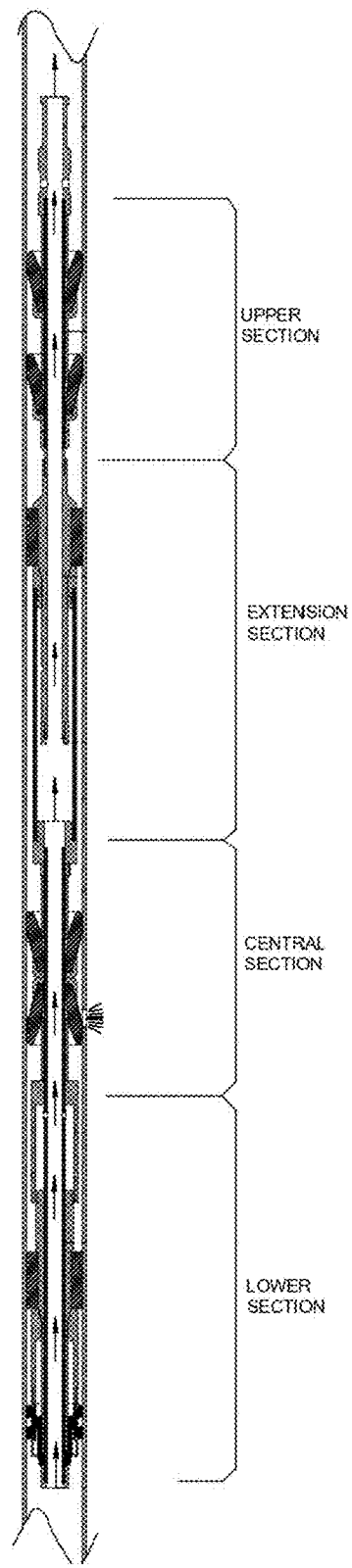
Figure 5B:
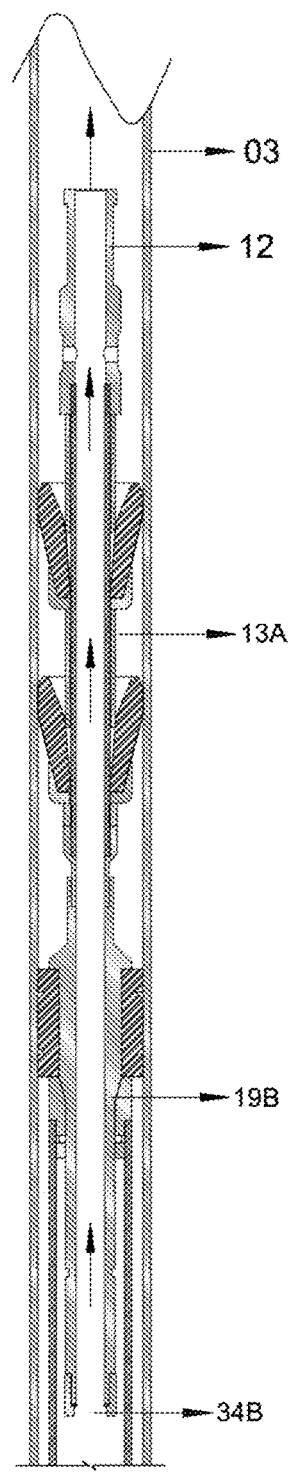
Figure 5C:
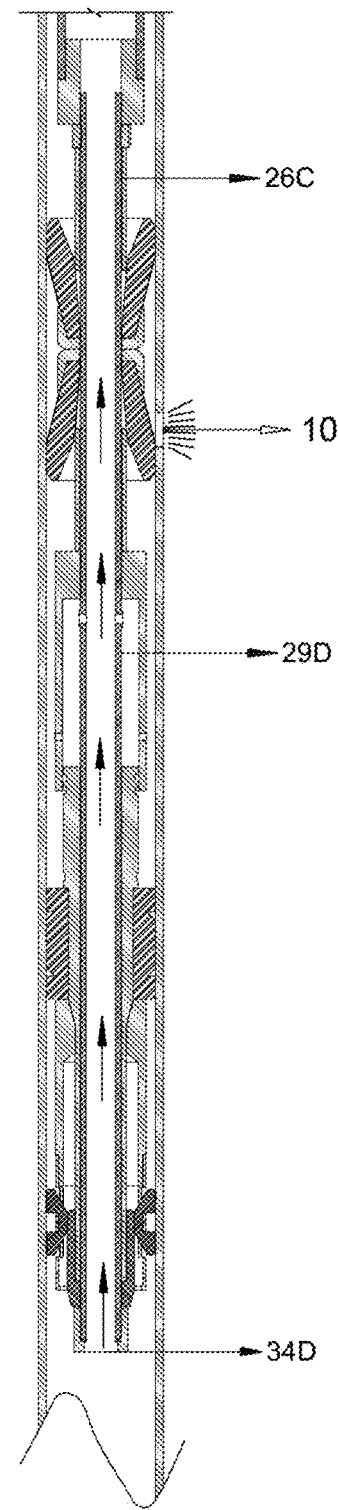
Figure 6A:
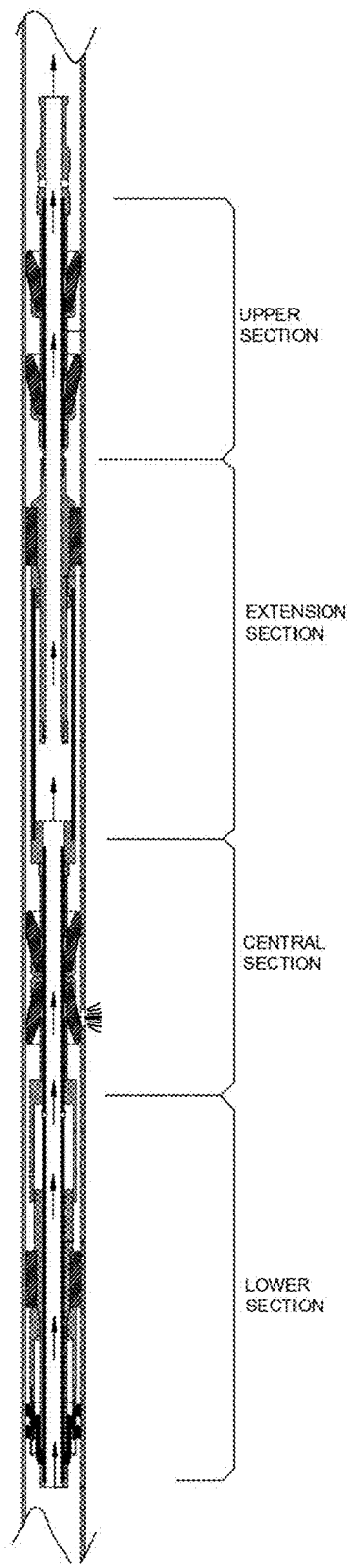
Figure 6B:
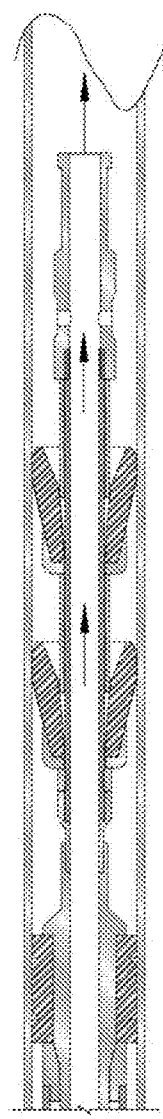
Figure 6C:
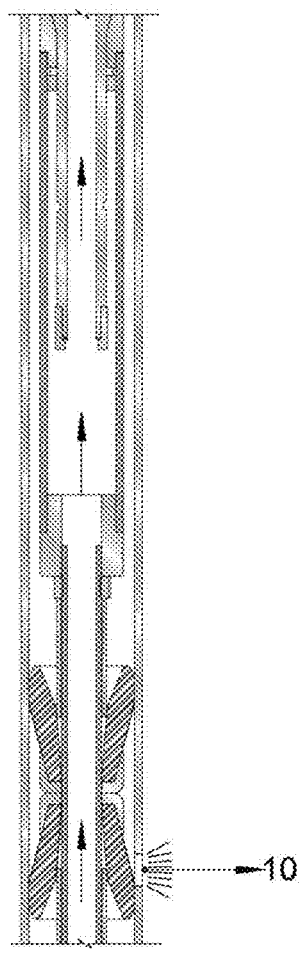
Figure 6D:
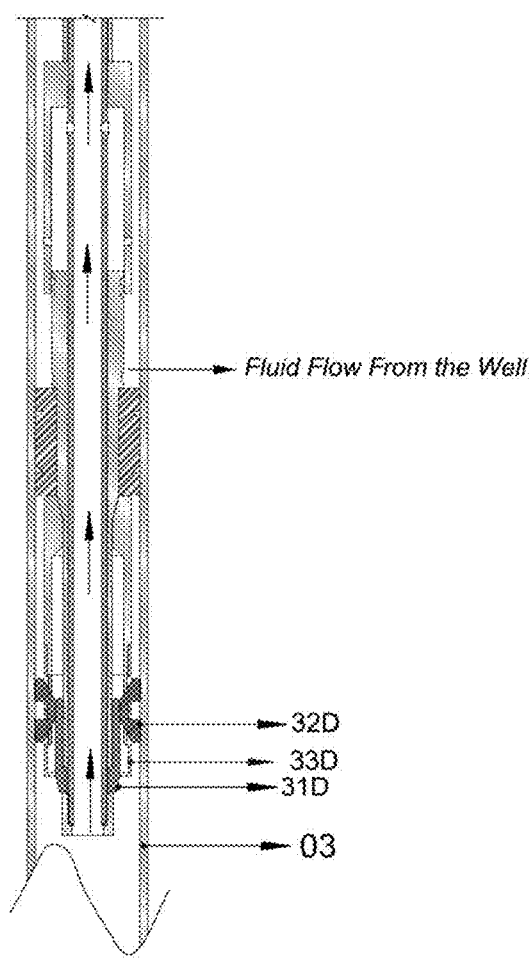

FIGS. 5A, 5B, and 5C, collectively referred to as FIG. 5 show cross section views of the flow path inside the hydraulic device, once the hole or crack has been detected, and the inverted internal path of the flow going up the lower cylinder [FIG. 5C (29D)], the central cylinder [FIG. 5C (26C)], the Extension Tube [FIG. 5B (24B)], the upper cylinder [FIG. 5B (13A)], and going out through the fishing neck [FIG. 5B (12)], to continue to flow through the production tubing [FIG. 5B (03)], once the hole or crack has been filled.

FIGS. 6A, 6B, 6C, and 6D, collectively referred to as FIG. 6 show cross section views of the anchor means in the hydraulic device [FIG. 2A], now activated. It shows the hole or crack [FIG. 6C (10)] in the production tubing [FIG. 6D (03)], the location of the 2 lower Wedges [FIG. 6D (32D)] and the Sliding Cone [FIG. 6D (31D)].

DETAILED DESCRIPTION OF THE INVENTION

To apply the hydraulic device and the method to locate and seal holes or cracks in production tubing at oil wells, the following steps will be taken:

First Step: Before a sealing method is carried out, the technical traits to be met by the completion and the well to be intervened must be determined, which must comply with the following specifications:

a) The oil lifting type, preferably by jet hydraulic pumping (JHP), natural flow (NF), or submersible electric pumping (SEP) (FIG. 1);

b) the diameter of the production tubing [FIG. 1(03)] installed, which must be between 75 mm and 115 mm;

c) having a settling nipple [FIG. 1(09)] and a flow sleeve in place [FIG. 1(04)] at the bottom of the production tubing.

d) having the following data records in connection with the well and the completion: production flows, parameters of produced fluids, well bottom pressures, and operating pressures for artificial type lifting.

Second Step: Perform leak tests on the tubing

Once the well and completion information is available, a leak test will be performed on the production tubing [FIG. 1(03)] and, for this purpose, a valve must be installed at the bottom of the well, on the settling nipple [FIG. 1(09)], or in the circulation sleeve [FIG. 1(04)], such installation being usual and known in the state of the art. Once the valve is installed at the bottom of the well, the production tubing is then pressurized by pumping a fluid from the surface, at an increasing pressure within a range of 689.48 KPa (100 psi) to 27,939.03 KPa (4000 psi); if there comes a time when the pressure of the pumped fluid no longer increases, then the production tubing is hermetic; otherwise, if the pressure decreases, this would confirm the presence of a fluid leak through a hole or crack [FIG. 3(10)] in any section of the production tubing [FIG. 1(03)] towards the annular space [FIG. 1(05)]. Then, note the information relative to the flow of the fluid that runs through the annular space FIG. (1. 05), which corresponds to the flow of the fluid running through the hole or crack [FIG. 3(10)], using, for this purpose, a flow meter on the surface. The flow information is important in order to determine the characteristics of the hole or crack on the production tubing.

Third Step: Hermetic sealing method

Once the above steps have been carried out, and after confirming the existence of a hole or crack on the production tubing [FIG. 1(03)], the following method is then conducted, by using the innovative hydraulic device, as described in [FIG. 2], which is introduced and coupled to the production tubing until it becomes hermetically sealed:

The hydraulic device [FIG. 2] is hydraulically displaced from the surface at a pressure of 344.74 KPa (50 psi) through the production tubing interior, which is filled with the fluid used in the leak test previously described; when the device stops and the pressure increases, the location of the hole or crack [FIG. 4 (10)] may be detected, and this event occurs because the device can no longer move forward, as it has reached the level of the fluid column caught between the bottom valve and the level at which the hole or crack is situated; at this moment, the technician who is monitoring the operation on the surface proceeds to increase the hydraulic pressure so the device can be attached in that location [FIG. 5] and it creates a hermetic sealing between the body of the hydraulic device and the production tubing through the upper expansion joints [FIG. 4(20B)] and the lower expansion joints [FIG. 4(20D)], filling the hole or crack [FIG. 4(10)] that was detected in the production tubing [FIG. 4(03)] and thus allowing for the free circulation of fluids, with no leakage, between the well and the surface or vice versa, through the hydraulic device.

In order to run the above method, the following steps are taken:

I. Displacement of the Hydraulic Device

1. The pumped fluid comes in through the Fishing Neck [FIG. 2(12)], it goes through the upper cylinder [FIG. 2(13A)], until it gets pressurized in the Rupture Disc [FIG. 3(34B)], thus forcing the Hydraulic Device to move downwards.

2. At the same time, the fluid outside the Hydraulic Device [FIG. 2] causes the expansion of the Retainer Rubbers [FIG. 3(15A)], which controls the downward movement of the hydraulic device.

3. Consequently, the existing fluid at the production tubes is progressively pushed by the hydraulic device [FIG. 2], as it is pressed downwards and forced to exit through the hole or crack [FIG. 3(10)] on the production tubing [FIG. 3(03)], until the detection means or the Retainer Rubber that is now inverted downwards [FIG. 4(15C)] surpasses the hole or crack, thus bringing the leak to an end.

II. Location of Hole or Crack and Settling of Upper Section

1. At the moment when the hole or crack [FIG. 4(10)] is blocked, the pressure measured on the surface is increased until it reaches 8273.76 KPa (1200 psi), which causes the breakage of the Cutting Set Screws [FIG. 4(22B)], thus releasing the Upper Piston [FIG. 4(19B)], which begins to go down through the inside of the Extension Tube [FIG. 4(24B)] at the Extension Section, and then goes into the interior diameter of the upper Expansion Joints [FIG. 4(20B)] and presses them against the interior walls of the production tube [FIG. 4(03), leaving the Upper Section [FIG. 4] of the Hydraulic Device hermetically sealed and settled [FIG. 2].

III. Settling of Lower Section

1. To continue with the settling of the Lower Section, pressure is increased up to 15,168.56 KPa (2200 psi), which causes the upper Rupture Disc to break [FIG. 4(34B)] at the Upper Section, causing the fluid that is pumped from the surface to flow downwards through the Extension Tube [FIG. 4(24B)] at the Extension Section, in the Central Cylinder [FIG. 4(24B)] at the Central Section, and in the Lower Cylinder [FIG. 4(29D)] at the Lower Section, until it reaches the lower Rupture Disc [FIG. 4(34D)]. Then, pressure is reduced to its prior lower value.

2. The pressure of the fluid is increased in order to push it through the flow holes [FIG. 4(35D)] in the Lower Cylinder [FIG. 4(29D)], until pressure is exerted on the Lower Piston [FIG. 4(27D)] and a pressure of 9,652.72 KPa (1400 psi) is reached, which causes the 2 lower Cutting Set Screws to break [FIG. 4(22D)], thus displacing the Lower Piston [FIG. 4(24B)] downwards, until it goes into the interior diameter of the lower Expansion Joints [FIG. 4(20D)] and presses them against the interior walls of the production tube [FIG. 4(03), thus leaving the Lower Section [FIG. 4] of the Hydraulic Device hermetically sealed and settled.

IV. Anchoring of Sliding Cone

1. The last cited action causes the anchoring of the Sliding Cone [FIG. 4(31D)], which is threaded to the Lower Piston [FIG. 4(28D)], in the Wedges [FIG. 4(32D)] through the inside of the Cage [FIG. 4(33D)], thus leaving the Lower Section of the Hydraulic Device hermetically sealed and anchored [FIG. 2] against the walls of the Production Tubing [FIG. 4(03)].

V. Hermetic Sealing Completion
1. Pumping pressure is continuously increased up to 17237 KPa (2500 psi) in order to check the settling of the Hydraulic Device [FIG. 2]. Once this is verified, the lower Rupture Disc [FIG. 4(34D)] breaks, thus establishing communication between the lower [FIG. 5(29D)], central [FIG. 5(26C)] and upper cylinders [FIG. 5(13A)], so that the fluids may flow [FIG. 1(08)] normally through the interior of the Hydraulic Device [FIG. 2] and the production tubing, in any direction.

The invention claimed is:

1. A hydraulic device for in situ sealing of cracks and holes in production tubing of oil wells, located underground, said hydraulic device having 4 sections with a total length of 2.00 m to 3.00 m and a diameter of 70 to 80 mm that comprises:
   a) an upper section, comprising:
      an upper cylinder, and
      upper displacement means;
   b) an extension section, comprising:
      an upper piston,
      an upper sealing means located on an upper segment of the upper piston,
      an upper rupture disc located at a lower end of the upper piston,
      an extension tube comprising an upper part that holds the upper piston with a plurality of set screws, and a lower part that is coupled with a central section of the hydraulic device, and
      a lower adapter that connects a lower part of the extension section to the central section of the hydraulic device;
   c) the central section, comprising:
      a central cylinder,
      lower displacement means, and,
      wherein a lower part of the central section is connected to a lower piston housing; and,
   d) a lower section, comprising:
      the lower piston housing that contains, within its lower part
      a plurality of lower set screws,
      a lower cylinder,
      a lower piston,
      lower sealing means,
      a sliding cone, and
      anchoring means, comprising a cage and, a plurality of wedges.

2. The hydraulic device as claimed in claim 1, wherein the upper cylinder is connected by its upper part to a fishing neck by a threaded joint and, by its lower part, to the extension section through a reduction.

3. The hydraulic device as claimed in claim 1, wherein the upper sealing means of the upper section comprises: a plurality of spacers, a plurality of retainer rubbers, a plurality of rubber retainers and an adjuster nut to adjust the retainer rubbers.

4. The hydraulic device as claimed in claim 3, wherein the retainer rubbers are shaped like truncated cones, with their larger diameter placed upwards.

5. The hydraulic device as claimed in claim 1, wherein the upper piston at the extension section has an external diameter that gradually varies from top to bottom, featuring a larger diameter at its upper part, with a flange that acts as a stopper; a second segment where the diameter is reduced by a length similar to that of expansion joints, and a remaining segment, with a smaller diameter, wherein the upper piston is introduced into the extension tube after going through the upper sealing means; and a lower portion of the upper piston is covered by a rupture disc, which is supported by a disc retainer.

6. The hydraulic device as claimed in claim 1, wherein the upper sealing means are located on a segment of the upper piston with a smaller diameter, and the the upper sealing means comprises: a plurality of expansion joints attached to the upper part of the extension tube by an upper joint retainer.

7. The hydraulic device as claimed in claim 1, wherein the extension tube has cutting set screws on its upper part, which hold the upper piston, and the extension tube has the lower adapter on its lower part, allowing it to couple with the central section.

8. The hydraulic device as claimed in claim 1, wherein the lower displacement means in the central section comprises a plurality of spacers, a plurality of retainer rubbers, and a rubber retainer.

9. The hydraulic device as claimed in claim 1, wherein the retainer rubbers are shaped like truncated cones, with their larger diameters placed in opposite directions, upwards and downwards.

10. The hydraulic device as claimed in claim 1, wherein the lower cylinder of the lower section has a plurality of flow holes on its upper part, which communicate with the lower piston housing interior; and a rupture disc, held by a disc retainer on its lower end.

11. The hydraulic device as claimed in claim 1, wherein the lower piston located in an annular space between the lower piston housing and the lower cylinder has a diameter that gradually varies along three segments: a first segment, adjusted to the lower piston housing; a second segment, slightly smaller and with a length similar to a plurality of lower expansion joints; and a third segment, smaller than the second segment, which goes through the lower sealing means and enters the sliding cone.

12. The hydraulic device as claimed in claim 1, wherein the lower sealing means comprises: a plurality of expansion joints, set in position by a lower joint retainer at a lower segment of the lower piston.

13. The hydraulic device as claimed in claim 1, wherein the sliding cone is mounted on a lower end of the lower piston and slides between a lower joint retainer and the lower cylinder.

14. A method for in situ sealing of holes, cracks or leaks in joints in underground production tubing of oil wells, for extraction of fluids from the oil wells to a surface, comprising the following steps:
   I. displacement of the hydraulic device as claimed in claim 1,
   II. locating the hole or crack
   III. settling of the upper section
   IV. settling of the lower section
   V. completion of the hermetic sealing.

15. The method for in situ sealing of holes, cracks or leaks in joints as claimed in claim 14, wherein the displacement of the hydraulic device is performed by means of a driving liquid that is pumped from the surface and enters the hydraulic device through a fishing neck, going through the upper cylinder until it gets pressurized in the upper rupture disc, forcing the hydraulic device to move downwards; through an interior of the production tubing and, at a same time, fluid outside the hydraulic device causes an expansion of a plurality of retainer rubbers, controlling movement and causing the fluid that is contained in the production tubing below the hydraulic device to be forced to exit through a leak site on the production tubing, until a detection means or a retainer rubber that is upside down surpasses the hole or crack, thus bringing the leak to an end.

16. The method for in situ sealing of holes, cracks or leaks in joints as claimed in claim 14, wherein, at a moment when the hole or crack is blocked, a pressure that is measured on the surface is increased up to 8273.76 KPa (1200 psi), which causes the set screws of the hydraulic device to break and release the upper piston, which begins to go down through an inside of the extension tube at the extension section, and then goes into an interior diameter of a plurality of upper expansion joints and presses them against interior walls of the production tube, leaving the upper section of the hydraulic device hermetically sealed and settled.

17. The method for in situ sealing of holes, cracks or leaks in joints as claimed in claim 14, wherein, after fixing the upper section of the hydraulic device, the lower section is then fixed, by increasing a pressure up to 15,168.56 KPa (2200 psi), which causes the upper rupture disc to break; the pressure is reduced to its prior lower value and pumped fluid flows downwards, through the extension tube at the extension section, in the central cylinder at the central section, and in the lower cylinder at the lower section, and exerts pressure on a lower rupture disc, after which the pressure of the fluid is increased in order to push it through flow holes in the lower cylinder, until pressure is exerted on the lower piston and a pressure of 9,652.72 KPa (1400 psi) is reached, which causes the lower set screws to break displacing the lower piston downwards, until it goes into an interior diameter of a plurality of lower expansion joints and presses them against interior walls of the production tube, leaving the lower section of the hydraulic device hermetically sealed and settled.

18. The method for in situ sealing of holes, cracks or leaks in joints as claimed in claim 14, wherein, by increasing a pressure used to fix an interior section, the sliding cone is anchored, threaded to the lower piston in the wedges through the inside of the cage, leaving the lower section of the hydraulic device hermetically sealed and anchored against walls of the production tubing.

19. The method for in situ sealing of holes, cracks or leaks in joints as claimed in claim 14, wherein, after settling the upper and lower sections of the hydraulic device for the sealing of holes, cracks or leaks, settling of the hydraulic device is then verified and once verified, a lower rupture disc breaks, establishing communication between the lower, central, and upper cylinders, so that field fluids may flow normally through an interior of the hydraulic device and the production tubing, in any direction.

\* \* \* \* \*